United States Patent
Kaster

(10) Patent No.: US 12,528,477 B2
(45) Date of Patent: Jan. 20, 2026

(54) IMPLEMENTING A DYNAMIC TRUST MODEL IN A VEHICLE

(71) Applicant: Robert Bosch GmbH, Stuttgart (DE)

(72) Inventor: Robert M. Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 18/593,650

(22) Filed: Mar. 1, 2024

(65) Prior Publication Data
US 2025/0376173 A1   Dec. 11, 2025

(51) Int. Cl.
*B60W 50/00*    (2006.01)
*B60W 50/14*    (2020.01)
*H04L 9/40*     (2022.01)

(52) U.S. Cl.
CPC ........ *B60W 50/0098* (2013.01); *B60W 50/14* (2013.01); *H04L 63/1425* (2013.01); *B60W 2050/0022* (2013.01); *B60W 2556/10* (2020.02)

(58) Field of Classification Search
CPC ............. B60W 50/0098; B60W 50/14; B60W 2556/10; B60W 2050/0022; H04L 63/1425
See application file for complete search history.

(56) References Cited

U.S. PATENT DOCUMENTS

| 10,332,322 | B2   | 6/2019  | Nix |
| 11,695,574 | B2   | 7/2023  | Barrett et al. |
| 11,863,991 | B2   | 1/2024  | Yang et al. |
| 2021/0144152 | A1* | 5/2021 | Gogna .................... H04W 4/40 |
| 2022/0394053 | A1  | 12/2022 | Sorani et al. |
| 2023/0291578 | A1* | 9/2023 | Barrett .................... H04W 4/44 |
| 2024/0143705 | A1* | 5/2024 | MacGregor .......... G05D 1/2272 |

OTHER PUBLICATIONS

Anderson et al., "A Zero-Trust Architecture for Connected and Autonomous Vehicles," IEEE Internet Computing, 2023, pp. 7-14.
APTIV, "What Is a Software-Defined Vehicle?" <https://www.aptiv.com/en/insights/article/what-is-a-software-defined-vehicle> article dated Mar. 19, 2020 (5 pages).
AUTOSAR, "Specification on SOME/IP Transport Protocol," AUTOSAR CP R20-11, 2017, (59 pages).
Bosch, "The Software-defined Vehicle," <https://www.bosch-mobility-solutions.com/en/mobility-topics/software-defined-vehicle/> web page available at least as early as Jan. 16, 2024 (10 pages).

(Continued)

*Primary Examiner* — Wade Miles
*Assistant Examiner* — Jerrod Irvin Davis
(74) *Attorney, Agent, or Firm* — Michael Best & Friedrich LLP

(57) ABSTRACT

A system for implementing a dynamic trust model in a vehicle. The system comprises a first electronic device including an electronic processor. The electronic processor is configured to receive, from a second electronic device, a message associated with an action to be performed by the first electronic device, determine a trust score associated with the message, and determine, based on a safety consideration, a risk score associated with the action. The electronic processor is also configured to perform the action, in response to the trust score being greater than or equal to the risk score.

20 Claims, 8 Drawing Sheets

(56) References Cited

OTHER PUBLICATIONS

King et al., "BeyondCorp Building a Healthy Fleet," Usenix, 2018, vol. 43, No. 3, pp. 24-30.
Ward et al., "BeyondCorp A New Approach to Enterprise Security," Usenix, 2014, vol. 39, No. 6, pp. 6-11.
Gilman et al. "Zero Trust Networks," 2017, Chapter 1, pp. 1-4, 12, 16-17.
Huang et al., "Software-Defined Networking and Security from Theory to Practice," 2019, pp. 88-92.
Buttyán et al., "Security and Cooperation in Wireless Networks," 2007, Chapter 10, pp. 329-331.

\* cited by examiner

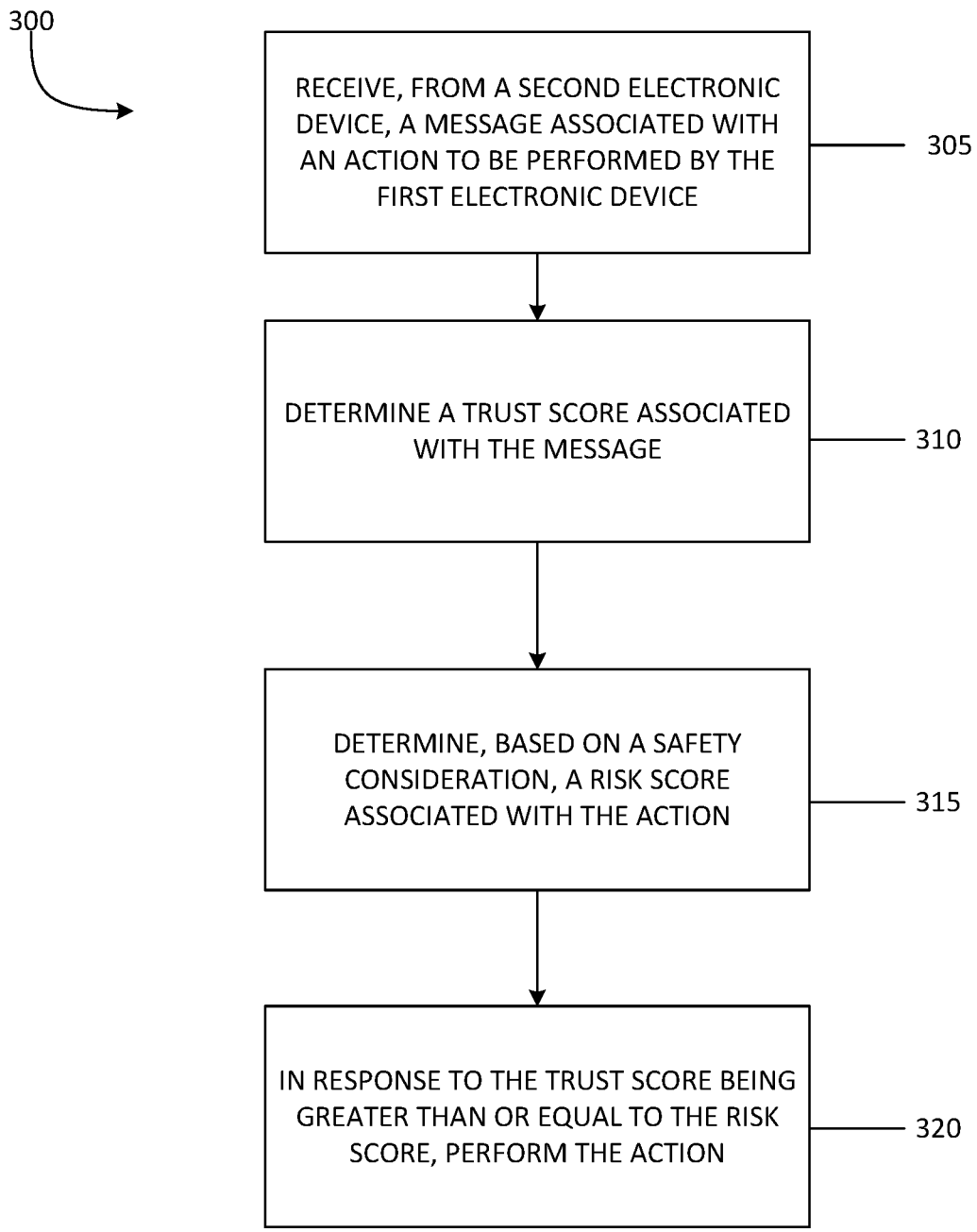

| f(i) | Distance | History | Authentication | VSOC | IDS |
|---|---|---|---|---|---|
| 0 | Unknown | New Partner | Failed MAC | Vehicle Compromised | IDS > 20% |
| 0.2 | Passes Through Firewall | | MAC Matches, But Recent Ones Didn't | Elevated Specific Suspicion | |
| 0.4 | Passes Through Gateway | | | | IDS < 20% |
| 0.6 | | | Truncated MAC | | |
| 0.8 | Dedicated Bus | | 128-Bit MAC/ RSA 2048 | Elevated General Suspicion | IDS < 1% |
| 1.0 | Same ECU | Long-Term Partner | 256-Bit MAC/ RSA 4096 | No Known Concerns | IDS < 0.1% |

FIG. 4

| FMEA Severity | Description |
|---|---|
| 1 | Not Discernable |
| 2 | Error Codes Logged |
| 3 | Experts Could Detect Change In Operation |
| 4 | Some People Would Report Annoyance |
| 5 | Erratic, But Controllable Operation |
| 6 | Warranty Voided |
| 7 | Vehicle Inoperable (Graceful Shut Down) |
| 8 | Loss Of Control At Low Speed |
| 9 | Failure To Comply With Legal Requirements |
| 10 | Loss Of Control At High Speed |

*FIG. 5A*

| Rating | ASIL |
|---|---|
| 0 | QM |
| 1 | ASIL-A |
| 2 | ASIL-B |
| 3 | ASIL-C |
| 4 | ASIL-D |

*FIG. 5B*

| Weight | Trust Value |
|---|---|
| 5 | Distance<br>5 Same ECU<br>4 Protected Bus<br>3 Open Bus<br>2 Passes Through Gateway<br>1 Passes Through Firewall<br>0 Unknown |
| 2 | History<br>2 Message Comes From Long-Time Partner<br>0 Message Comes From New Source |
| 5 | Authentication<br>5 Signed By MAC<br>3 Signed By MAC, Several Messages Have Not Had Correct Signature<br>1 No Authentication<br>0 Failed Authentication |
| 5 | VSOC |
| 3 | Internal IDS/ Plausibility Monitoring |

FIG. 6

IMPLEMENTING A DYNAMIC TRUST MODEL IN A VEHICLE

SUMMARY

Modern vehicles include a collection of highly-specific Electronic Control Unit (ECU) s. ECUs communicate with one another but each ECU is uniquely entrusted with a specific functionality. For example, an Anti-lock Braking System (ABS) ECU is designed to control a braking system of a vehicle and software functions for controlling braking of the vehicle are included in the ABS ECU. Currently, the problem of trust or security within the ECU architecture is solved by setting up symmetric keys to authenticate messages between critical ECUs. Messages with high safety impact may include a message signature based on a key to provide a high level of confidence that the message is coming from the correct ECU and not a compromised imposter. An ECU's access to signing keys or ability so sign a message using a key may be revoked when it is determined that the ECU has been compromised.

Keys used in current vehicles are assigned and stored in the memory of each ECU by the manufacturer during assembly of a vehicle. If any update to the keys is needed, a protected environment is required. In general, symmetric key solutions used to provide security in the ECU architecture are considered static and rigid, meaning that the keys seldom change and only with great difficulty. In current security techniques, the sender ECU calculates a message signature based on a key and sends a message signed with the message signature, then the receiver ECU calculates the signature of the message using the key included in its own memory. If the message signature included in the message from the sender ECU matches the message signature that the receiver ECU calculates, then the receiver ECU trusts the message. If the message signature included in the message from the sender ECU does not match the message signature calculated by the receiver ECU, then the receiver ECU ignores the message. In other words, in the shared key solution, a receiver ECU has a binary response-either complete trust or complete lack of trust. There is no in-between or gradation.

However, as vehicles become more reliant on software, the binary trust solution to cyber security that is currently implemented becomes less applicable. For example, autonomous and semi-autonomous vehicles face fundamentally new cybersecurity challenges and require a more flexible vehicle software architecture. Service-oriented vehicle software architectures allow software modules to request services and negotiate them in real-time. Software Defined Vehicle (SDV)s rely on powerful central computers to control vehicle operation and receive frequent updates.

Zero Trust (ZT) cybersecurity systems have grown in popularity. Currently, ZT is used to protect confidential information or privacy in Information Technology (IT) systems. In IT systems, the ZT cybersecurity system uses a twofold question of trust. First, the ZT cybersecurity system asks "Can the requestor prove his identity?" Second, the ZT cybersecurity system asks "Is the requestor authorized to access the requested information?" SDVs, service-oriented vehicle software architectures, and vehicles with autonomous functionality require trust to be dynamic, nuanced, and adaptive. ZT allows trust to be dynamic, nuanced, and adaptive.

However, when applying apply ZT to enhance security in vehicles rather than IT systems, ensuring physical safety is the primary concern. Inside a vehicle, multiple sources may readily supply information and, within the confines of the vehicle, the current state and functions of the vehicle are not really a secret that needs to be protected. Within the vehicle, the main cybersecurity question is not "Do I trust the other electronic device enough to tell them what I'm doing?", but "Do I trust the other electronic device enough to take an action based on what they're telling me?" In contrast to ZT in IT systems, where the question is about access, for cyber-physical systems such as vehicles, the question is about actions. Therefore, in some implementations described herein, each potential action that an electric device (for example, an ECU) within a vehicle may take has an associated safety risk.

When multiple sources within the vehicle can provide similar information, there are several use cases where the dynamic trust model described herein can provide significant benefits. For example, implementations described herein allow for validation of possible variations of the inputs to the dynamic trust model (for example, trust values associated with trust factors (described further below)) during the development phase, and, therefore, the total validation effort required to maintain the dynamic trust model in a vehicle over the long term can be significantly reduced. Vehicle Security Operations Centers (VSOC) actively monitor fleets of vehicles for anomalous behavior and need a quick method of incorporating this sensitive information into safety-critical systems. The dynamic trust model described herein allows an Original Equipment Manufacturer's (OEM) VSOC to directly influence the vehicle. Intrusion Detection Systems (IDSs) have been designed to detect anomalous behavior in automotive systems, but high false positive rates with aggressive actions (for example, stopping the vehicle, slowing the vehicle, and the like) taken when threats are detected make it difficult to allow IDSs to interact with critical systems. With millions of Controller Area Network (CAN) messages exchanged between electronic devices in a vehicle per hour, the number of false detections made by an IDS is so high that it prevents the IDS from being useful. For example, drivers who receive one or more false warnings a day, may ignore warnings regarding real or true threats. The dynamic trust model described herein allows determinations made by an IDS to be taken into account with out resulting in such a high false positive rate so as to be useless.

Thus, implementations described herein provide a dynamic trust model that weighs a risk associated with taking an action against a trust associated with a message requesting that the action be taken. The risk associated with taking an action is determined, at least in part, on safety considerations associated with taking an action. In some implementations, the trust associated with the message is determined, at least in part, on information received from the VSOC and determinations made by the IDS. Implementations described herein also weigh a risk associated with taking an action against a trust associated with a message to determine an extent to which data included in the message should be relied upon when determining a value.

For example, one implementation provides a system for implementing a dynamic trust model in a vehicle. The system comprises a first electronic device including an electronic processor. The electronic processor is configured to receive, from a second electronic device, a message associated with an action to be performed by the first electronic device, determine a trust score associated with the message, and determine, based on a safety consideration, a risk score associated with the action. The electronic processor is also configured to perform the action, in response to the trust score being greater than or equal to the risk score.

Another example implementation provides a method for implementing a dynamic trust model in a vehicle. The method includes receiving, from a second electronic device, a message associated with an action to be performed by a first electronic device, determining a trust score associated with the message, and determining, based on a safety consideration, a risk score associated with the action. The method also includes performing the action with the first electronic device in response to the trust score being greater than or equal to the risk score.

Yet another example implementation provides a system for implementing a dynamic trust model in a vehicle. The system comprises a first electronic device including an electronic processor. The electronic processor is configured to receive, from a second electronic device, a message associated with an action to be performed by the first electronic device, determine a trust score associated with the message, and determine, based on a safety consideration, a risk score associated with the action. The electronic processor is configured to determine a decreased reliance value and determine a value based on data included in the message and the decreased reliance value in response to the trust score being less than the risk score. The electronic processor is further configured to perform the action based on the value.

BRIEF DESCRIPTION OF THE DRAWINGS

FIG. 3 provides a flowchart of an example first method for implementing a dynamic trust model in a vehicle, in accordance with some implementations.

FIG. 4 provides an example table illustrating how trust factors influence a trust score, in accordance with some implementations.

FIG. 5A and FIG. 5B provide example tables illustrating information that may be used to determine risk scores associated with actions, in accordance with some implementations.

FIG. 6 provides an example table illustrating example trust values and weights associated with trust factors, in accordance with some implementations.

DETAILED DESCRIPTION

Before any embodiments, examples, aspects, and features are explained in detail, it is to be understood that they are not limited in their application to the details of construction and the arrangement of components set forth in the following description or illustrated in the following drawings. Other embodiments, examples, aspects, and features are possible, and they are capable of being practiced or of being carried out in various ways.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

Figure 1:
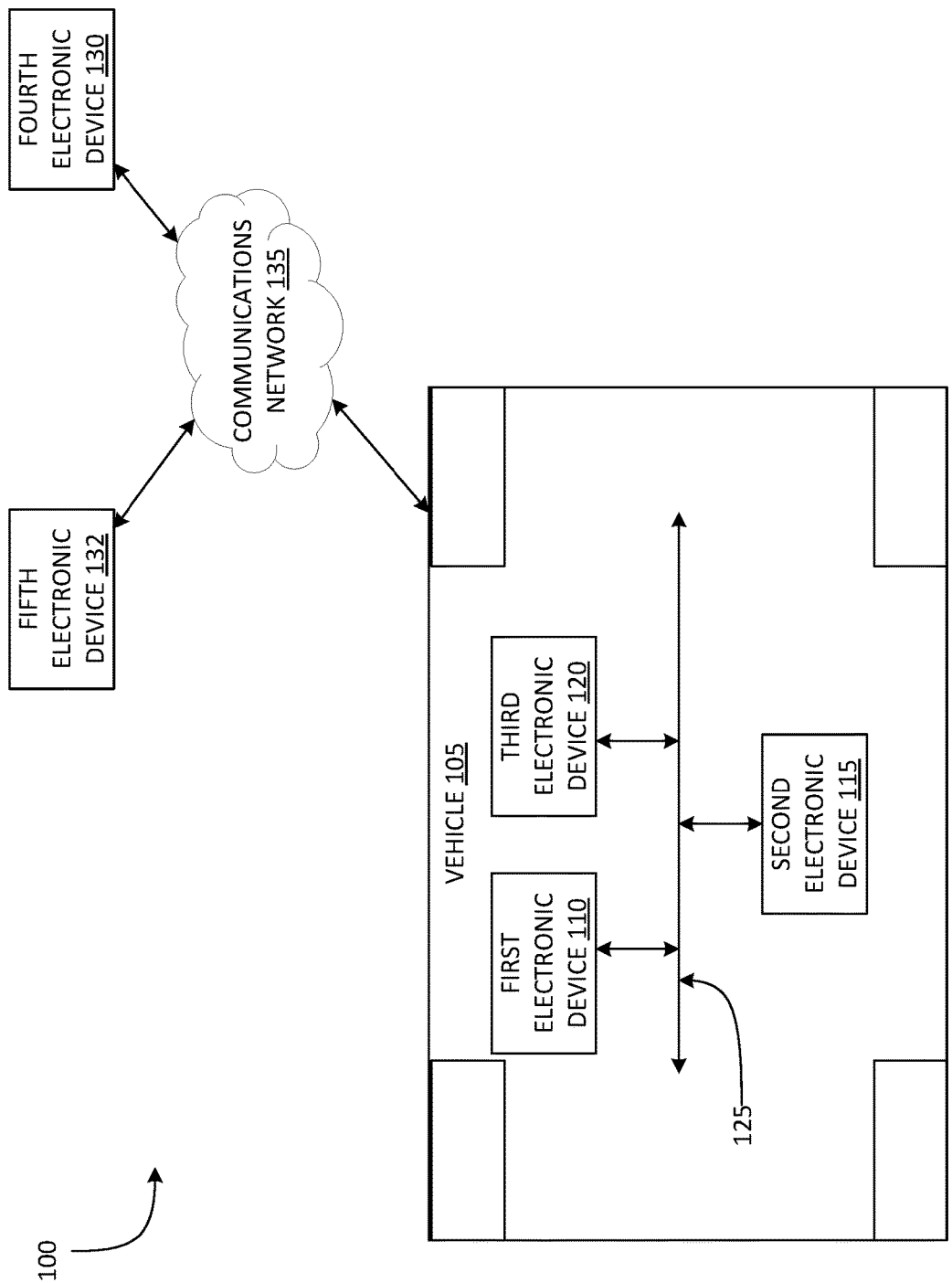
FIG. 1 schematically illustrates an example system for implementing a dynamic trust model in a vehicle, in accordance with some implementations.

FIG. 1 schematically illustrates an example system 100 for implementing a dynamic trust model in a vehicle 105. While implementations are described and illustrated herein as being implemented within a vehicle, the implementations described herein may be implemented within any cyber-physical machine or any machine with a computer that may perform actions that may have a physical impact in the tangible world. For example, the implementations described herein may be implemented in robots configured to perform tasks in factories, homes, offices, and the like. Additionally, while illustrated in FIG. 1 as a four-wheel vehicle, the vehicle 105 may be any type of vehicle, for example, a two-wheel vehicle such as a motorcycle, a three-wheel vehicle such as a tricycle, or an eight-wheel vehicle such as a semi-truck.

The vehicle 105 may include one or more electronic devices. The example vehicle 105 illustrated in FIG. 1 includes a first electronic device 110, a second electronic device 115, and a third electronic device 120. In some implementations, the first electronic device 110, the second electronic device 115, and the third electronic device 120 are ECUs. In other implementations, the first electronic device 110, the second electronic device 115, and the third electronic device 120 are generic computing devices. In some implementations, the first electronic device 110 may be a central computer. In some implementations, the vehicle 105 may include one or more components that are not illustrated herein. For example, the vehicle 105 may include one or more sensors such as a radar sensor, a lidar sensor, a camera, and the like. In some implementations, one or more of the second electronic device 115 and third electronic device 120 may be or include a sensor. Additionally, the vehicle 105 may include a different number of electronic devices than the three electronic devices illustrated in FIG. 1 as being included in the vehicle 105. The components of the vehicle 105, along with other various modules and components are electrically and communicatively coupled to each other via direct or indirect connections or by or through one or more control or data buses (for example, the bus 125), which enable communication therebetween. In some instances, the bus 125 is a Controller Area Network (CAN™) bus. In some instances, the bus 125 is an automotive Ethernet™, a FlexRay™ communications bus, or another suitable bus. In alternative instances, some or all of the components of the vehicle 105 may be communicatively coupled using suitable wireless modalities (for example, Bluetooth™ or near field communication connections).

In addition to the vehicle 105 and its components, the system 100 may include a fourth electronic device 130 and a fifth electronic device 132 that are located outside of the vehicle 105. In some implementations, the fourth electronic device 130 is a remote server that includes software that, when executed by an electronic processor, causes the server to implement the VSOC. In some implementations, the VSOC may be implemented by plurality of electronic devices working together (for example, one or more of servers, one or more databases, and the like). In some implementations, vehicle 105 may configured to send and receive Vehicle to Everything (V2X) communications (for example, Vehicle to Infrastructure (V2I) communications, Vehicle to Vehicle (V2V) communications, both, or the like) and the fifth electronic device 132 may be an electronic device that is included in another vehicle that the vehicle 105 is configured to communicate with or included in an infrastructure element (for example, a traffic light) that the vehicle 105 is configured to communicate with.

In some implementations, one or more of the electronic devices included in the vehicle 105 are configured to communicate with the fourth electronic device 130 and the fifth electronic device 132 through a communications network 135. The communications network 135 is a communications network including wireless connections, wired connections, or combinations of both. The communications network 135 may be implemented using a wide area network, for example, the Internet, a Long-Term Evolution (LTE) network, a 4G network, 5G network, or one of their successors, and one or more local area networks, for example, a Bluetooth™ network or Wi-Fi network, and combinations or derivatives thereof. In some implementations, the vehicle 105 may communicate with, via the communications network 135, electronic devices other than those electronic devices that are configured to implement the VSOC.

Figure 2:
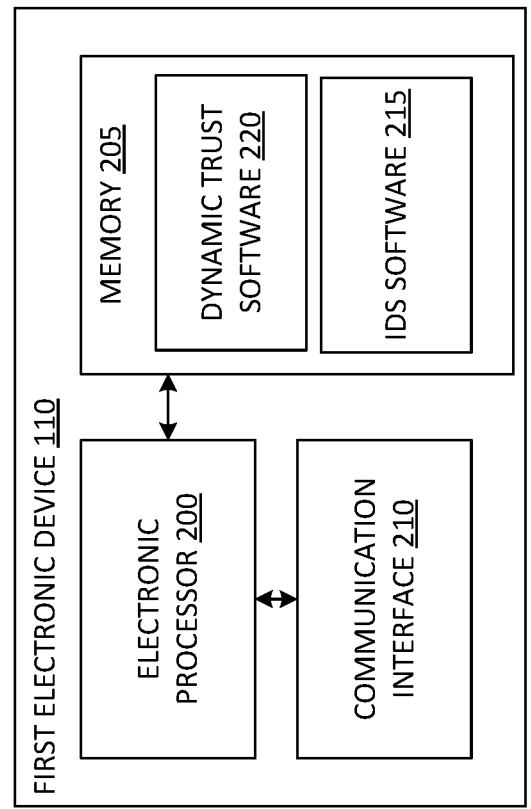
FIG. 2 schematically illustrates an example electronic device included in the system of FIG. 1, in accordance with some implementations.

FIG. 2 illustrates an example of the components included in the first electronic device 110. The first electronic device 110 which includes an electronic processor 200 (for example, a microprocessor, application specific integrated circuit, etc.), a memory 205, and a communication interface 210. The memory 205 may be made up of one or more non-transitory computer-readable media. The memory 205 can include combinations of different types of memory, such as read-only memory ("ROM"), random access memory ("RAM"), electrically erasable programmable read-only memory ("EEPROM"), flash memory, or other suitable memory devices. The electronic processor 200 is coupled to the memory 205 and the communication interface 210. The electronic processor 200 sends and receives information (for example, from the memory 205 and/or the communication interface 210) and processes the information by executing one or more software instructions or modules, capable of being stored in the memory 205, or another non-transitory computer readable medium. The software can include firmware, one or more applications, program data, filters, rules, one or more program modules, and other executable instructions. The electronic processor 200 is configured to retrieve from the memory 205 and execute, among other things, software for performing methods as described herein. In the example illustrated, the memory 205 stores, among other things, an IDS 215 and dynamic trust software 220. In some implementations, the IDS may be stored in the memory of an electronic device (for example, an ECU or a central gateway) included in the vehicle 105 other than the first electronic device 110. The communication interface 210 transmits and receives information from devices external to the first electronic device 110 (for example, components of the vehicle 105 via the bus 125 and the fourth electronic device 130 and the fifth electronic device 132 via the communications network 135). In some implementations, the second electronic device 115 and the third electronic device 120 have components and connections similar to the components and connections illustrated in FIG. 2 as being included in the first electronic device 110. In some implementations, the fourth electronic device 130 and the fifth electronic device 132 may also include similar components and connections as the first electronic device 110. However, the memory of the fourth electronic device 130 and fifth electronic device 132 may include different software components than those illustrated as being included in the memory 205 of the first electronic device 110.

FIG. 3 provides a flowchart of an example first method 300 for implementing a dynamic trust model in a vehicle. In some implementations, the first method 300 is performed when the electronic processor 200 executes the dynamic trust software 220. In some implementations, the method 300 begins at step 305, when the electronic processor 200 of the first electronic device 110 receives, from a second electronic device, a message associated with an action to be performed by the first electronic device 110. In some implementations, the second electronic device described in step 305 may be the second electronic device 115 (for example, an ECU, a sensor, or a generic computing device). For case of illustration, the second electronic device referred to in the method 300 is described as the second electronic device 115 below, however this is only one example of what the second electronic device described in the method 300 may be. In other implementations, the second electronic computing device 115 may be the fifth electronic device 125 (for example, an electronic device included in another vehicle or an infrastructure component that the vehicle 105 is configured to communicate with). In yet other implementations, the second electronic device may be a component included in the first electronic device 110 (for example, the memory 205 or an additional memory or electronic processor (not illustrated in FIG. 2) included in the first electronic device 110). The action may be controlling movement of the vehicle 105, outputting information to a vehicle operator, or the like. For example, the second electronic device 115 may be an ECU that controls a steering system of the vehicle 105, the first electronic device 110 may be an ECU that controls a braking system of the vehicle 105, and the message may request that the first electronic device 110 perform the action of applying the brakes to slow the vehicle 105 to a speed of 45 mph while the vehicle 105 makes a gradual turn.

At step 310, the electronic processor 200 determines a trust score associated with the message. In some implementations, the electronic processor 200 is configured to determine the trust score associated with the message based on one or more trust factors. The one or more trust factors may include a threat likelihood determined by the IDS for the message, data from the VSOC, a history between the first electronic device 110 and the second electronic device 115, a distance associated with the message, and an authentication status of the second electronic device 115, and the like.

FIG. 4 includes an example table 400 illustrating how trust factors influence the trust score associated a message. It should be understood that the values included in the tables illustrated in FIG. 4, FIG. 5A, FIG. 5B, and FIG. 6 are merely illustrative and do not necessarily demonstrate a working example. Each row included in the table 400 represents a different example message received by a first electronic device (for example, the first electronic device 110) from a second electronic device (for example, the second electronic device 115). Column 405 includes a trust score (f(i)) associated with a message. In the example illustrated in FIG. 4, the lowest trust score that can be associated with message is 0 and the highest trust score that can be associated with a message is 1.

Column 410 includes a distance a message travels when it is sent by the second electronic device 115 to the first electronic device 110. The greater the distance a message travels or the more jumps a message makes, the greater the likelihood that the message may be tampered with. Therefore, as illustrated in the table 400, as the distance the message travels increases, the trust score of the message lowers.

Column 415 includes a history between the first electronic device 110 and the second electronic device 115. The longer the length of time during which the first electronic device 110 has been trusting messages from the second electronic device 115, the greater the trust score determined for messages from the second electronic device 115 is.

Column 420 includes an authentication status of the second electronic device 115 or whether and how the first electronic device 110 authenticates the second electronic device 115. For example, in the row 435, the message does not include a message authentication code (MAC) or includes a MAC that the first electronic device 110 does not recognize, therefore the authentication trust factor contributed to the low trust score associated with the example illustrated in row 435. Additionally, the longer the MAC, the more difficult it is for a bad actor to replicate. Therefore, longer MACs will contribute to greater trust scores for messages that are signed with them. It should be understood that the MAC is one example form of authentication and other forms of authentication may be used to authenticate messages between the first electronic device 110 and the second electronic device 115. For example, RSA may also be used to authenticate messages between electronic devices.

Column 425 includes data from the VSOC. The VSOC may receive data from each vehicle in a fleet of vehicles and compile that data to gain insight into the cybersecurity threats that vehicles currently face. For example, the VSOC may determine that a certain type of sensor included in vehicles is vulnerable to attack from a bad actor. The VSOC may then alert the vehicles in the fleet to treat messages received from that type of sensor with a greater level of suspicion. Therefore, VSOC data associated with the second electronic device 115 lowers the trust score associated with the message received from the second electronic device 115.

Column 430 includes a threat likelihood determined by the IDS for a message. For example, in row 435, the IDS determines that there is a greater than twenty percent chance that the message is compromised or associated with a cybersecurity threat and, therefore, the trust score associated with the message is negatively impacted. In contrast, in the example illustrated in row 440, the IDS determines that there is a less than 0.1 percent chance that the message is compromised or associated with a cybersecurity threat and, therefore, the trust score is positively impacted.

In some implementations, at step 315, the electronic processor 200 determines, based on a safety consideration, a risk score associated with the action. In some implementations, a safety consideration is a potential physical consequence of the action being performed and a value is assigned to the safety consideration based on a severity of harm associated with the potential physical consequence of the action. Two available methods for calculating or determining a risk score associated with an action in a vehicle are Failure Mode and Effect Analysis (FMEA) severity and Automotive Security Integrity Level (ASIL). FIG. 5A illustrates an example table 500 of potential physical consequences (included in column 505) and their associated values (included in column 510). For example, in row 515, the potential physical consequence of losing control of the vehicle at a high speed is associated with a value of 10 while, in row 520, the potential physical consequence of loss of control at a low speed is associated with a value of 8 because the a greater severity of harm can be caused when a vehicle loses control at a high speed than can be caused when a vehicle loses control at a low speed. In one example implementation, when the action has a potential physical consequence of loss of control of the vehicle 105 at a low speed, the risk score will be 8. FIG. 5B illustrates an example table 525 of ASIL levels and their associated risk scores. Each action may be assigned to an ASIL level based on the severity of harm associated with the potential physical consequence of the action. Actions that have potential physical consequences with high severity of harm are assigned to level ASLI-D and, based on the example table 525, are assigned a risk score of 4. Actions that have potential physical consequences with little to no severity of harm are assigned to level QM and, based on the example table 525, are assigned a risk score of 0.

In some situations, privacy considerations may be relevant to determining a risk score associated with the action. For example, privacy considerations may be relevant to determining a risk score associated with the action when the action is sharing the location of the vehicle with a remote device or sharing a user profile of an operator of the vehicle 105. Therefore, in some implementations, electronic processor 200 determines the risk score based on the safety consideration and a privacy consideration.

In some implementations, at step 320, the electronic processor 200 performs the action in response to the trust score being greater than or equal to the risk score. In some implementations, the electronic processor 200 declines to perform the action in response to the trust score being less than the risk score.

The method 300 is described below as a series of calculations. $A_M$ represents the action that the first electronic device 110 may perform based on the message M from the second electronic device 115. $R_A$ represents the risk score associated with performing the action $A_M$ and $R_A$=f (safety, privacy). In other words, the risk score is determined based on safety and privacy considerations. $T_M$ represents the trust score associated with the message sent to the first electronic device 110 and $T_M$=f(distance, history, authentication, VSOC, IDS). In other words, the trust score is determined based on one or more trust factors. A trust score can also be described as $T_M = \Sigma_i f(i)$ where i represents a trust factor. In other words, the trust score is the sum of trust values associated with the trust factors that the trust score is determined based on. For example, a first trust factor (such as a threat likelihood determined by the IDS for the message) may be associated with a trust value of 0.5, a second trust factor (for example, data from the VSOC) may be associated with a trust value of 1, a third trust factor (for example, the history between the first electronic device 110 and the second electronic device 115) may be associated with a trust value of 0.2, a fourth trust factor (for example, the distance associated with the message) may be associated with a trust value of 0.3, and a fifth trust factor (for example, an authentication status of the second electronic device 115) may be associated with a trust value of 0.5. Therefore, in the preceding example, the trust score is 2.5.

In some implementations, each trust factor may be associated with a weight and the trust score may be the sum of the weighted trust values for each of the trust factors. Equation 1 describes a normalized trust score that is calculated using one or more weighted trust factors.

$$T_M = \frac{\sum_i \text{Weight} * f(i)}{\text{Weight}_{Total}} \quad (1)$$

Weight$_{Total}$ may be used to normalize the trust score and may be calculated using Equation 2, provided below.

$$\text{Weight}_{Total} = \sum_i \text{Weight}_i \quad (2)$$

If $T_M \geq R_A$, the electronic processor 200 executes or performs the action $A_M$.

FIG. 6 provides an example table 600 illustrating example trust values and weights associated with trust factors. Each row included in the table 600 is associated with a trust factor. For example, row 605 is associated with the distance trust factor, row 610 is associated with the history trust factor, row 615 is associated with the authentication trust factor, row 620 is associated with the VSOC trust factor, and row 625 is associated with an IDS trust factor. Column 630 includes example weights assigned to each trust factor and column 635 includes example trust values assigned to trust factors given a specific situation. For example, when a message is sent from a second electronic device to a first electronic device via a protected bus, the trust value associated with the distance trust factor is 4. In another example, when a message passes through a firewall on its way from a second electronic device to a first electronic device, the trust value associated with the distance trust factor is 1.

Figure 7:
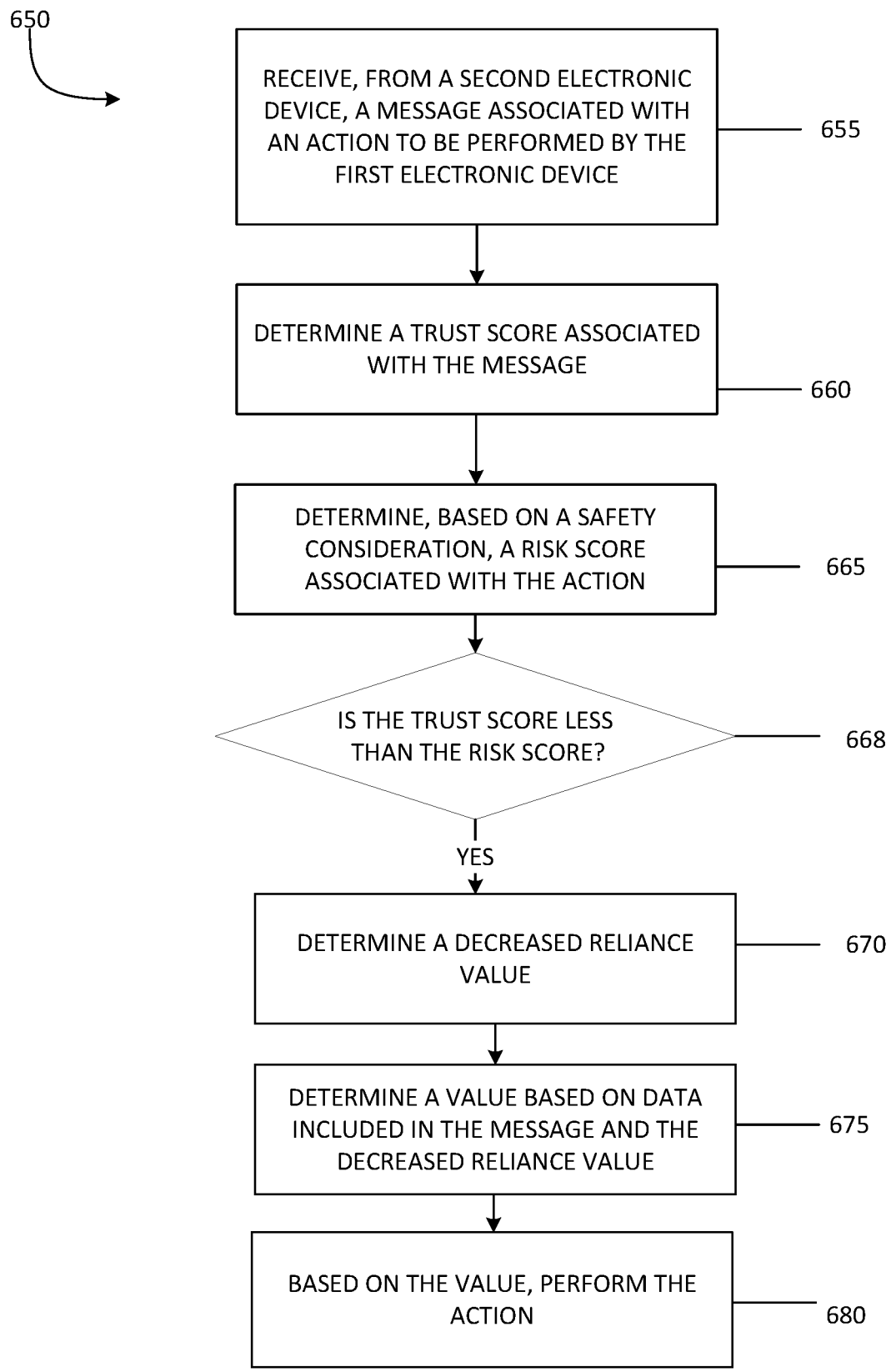
FIG. 7 provides a flowchart of an example second method for implementing a dynamic trust model in a vehicle, in accordance with some implementations.

FIG. 7 provides a flowchart of an example second method 650 for implementing a dynamic trust model in a vehicle. In some implementations, the second method 650 is performed when the electronic processor 200 executes the dynamic trust software 220. At step 655 the electronic processor 200 receives, from a second electronic device, a message associated with an action to be performed by the first electronic device. At step 660 the electronic processor 200 determines a trust score associated with the message. At step 665, the electronic processor 200 determines, based on a safety consideration, a risk score associated with the action.

Steps 655, 660, and 665 may be similar to steps 305, 310, and 315, respectively, described above in relation to the first method 300. However, the message associated with the action described in step 655 does not necessarily request that a first electronic device (for example, the first electronic device 110) perform an action. Rather, the first electronic device 110 may be configured to perform an associated action based on a value determined by the first electronic device 110 using data included in the message. For example, the second electronic device 115 may be or include a sensor, the first electronic device 110 may be an ECU that is configured to control a steering system of the vehicle 105, and the message received by the first electronic device 110 may include data that the first electronic device 110 considers when determining a value (for example, the speed of a following vehicle) to control the steering system of the vehicle 105 based on.

At step 668, the electronic processor 200, determines whether the trust score is less than the risk score. At step 670, the electronic processor 200, in response to the trust score being less than the risk score, determines a decreased reliance value. In some implementations, calculation or determination of a reliance value is described in Equation 3.

$$\text{Reliance} = \begin{cases} 5^{10(Trust-Risk)}, & \text{if Trust} < \text{Risk} \\ 1, & \text{otherwise} \end{cases} \quad (3)$$

In Equation 3, Reliance represents a reliance value, Trust represents the trust score, and Risk represents the risk score. In some implementations, the reliance value is determined using an exponential scale. As illustrated in Equation 3, when the trust score is greater than or equal to the risk score, the reliance value is 1 and the electronic processor 200 may determine a value based on data included in the message and perform an action based on the value as it would if a dynamic trust model were not implemented in the vehicle 105. When the trust score is less than the risk score, the reliance value is a decreased reliance value, (in this example, a value less than 1) based on a difference between the trust score and the risk score.

At step 675, when the trust score is less than the risk score, the electronic processor 200 determines a value based on data included in the message and the decreased reliance value. For example, the message may include data, from a radar sensor, regarding the position of an object in the environment of the vehicle 105. Based on the data from the radar sensor, data from a camera sensor, and data from a lidar sensor, the electronic processor 200 may determine a value (in this example, the position of the object in the environment of the vehicle 105). When a trust score associated with a message from the radar sensor is less than a risk score associated with an action the electronic processor 200 may perform based on the message from the radar sensor, the electronic processor 200 determines a decreased reliance value. When determining the value (in this example, the position of the object in the environment of the vehicle 105), based on the decreased reliance value, the electronic processor 200 relies less on the data included in the message from the radar sensor and may rely more on data from other sensors (for example, the camera sensor and the lidar sensor) to determine the value. In some implementation, the lower the decreased reliance value is, the less the electronic processor 200 relies on the data included in the message to determine a value.

At step 680, the electronic processor 200, based on the value, performs the action. For example, when the value is a position of an object in the environment of the vehicle 105 and the first electronic device 110 is an ECU that controls the braking system of the vehicle 105, the electronic processor 200 may stop or slow the vehicle 105 based on the position of the object in the environment of the vehicle 105.

In some implementations, a reliance value calculated for a message received from an electronic device at a previous time may be a trust factor that is used to calculate a trust score for a message received from the electronic device at a current time.

The following provides an example scenario in which a dynamic trust model is utilized. In this example, two sensors (a radar sensor and a camera) provide an estimate of the velocity of second vehicle traveling in front of the vehicle 105. A radar sensor provides an accurate velocity value with a tolerance of +/−1 km/hr. The camera provides a less accurate velocity with a tolerance of +/−5 km/hr. A typical sensor fusion strategy would be to combine the velocity values from the two sensor sources based on their accuracy (for example, weight the velocity from the radar sensor as five times more important than the velocity from the camera).

However, using the implementations described herein for implementing a dynamic trust model in a vehicle, the electronic processor 200 determines trust scores for the messages received from the radar sensor and the camera. The example described below focuses on determining trust scores for messages from the radar sensor that are received over a period of time during which the radar senor goes from uncompromised to compromised.

Before the radar sensor is compromised, the trust value associated with the trust factor of the threat likelihood determined by the IDS for the message is 1 (f(IDS)=1) because the IDS has built up sufficient trust in the radar sensor.

Before the radar sensor is compromised, the trust value associated with the trust factor of data from the VSOC is 1 (f(VSOC)=1) because the VSOC has built trust in the radar sensors in the fleet that the vehicle 105 is a member of. In this example, a weight of 5 is assigned to the trust factor of data from the VSOC (Weight$_{VSOC}$=5), to give the VSOC trust factor substantial weight in determining the trust score.

Both before and after the radar sensor is compromised, the trust value associated with the trust factor of authentication status of the electronic device sending the message is 1 (f(Authentication)=1), because, in this example, the assumption is that the attacker has successfully compromised the radar sensor and has avoided detection within the radar sensor. In this example, a weight of 3 is assigned to the trust factor of authentication status of the electronic device sending the message is 3 (Weight$_{Authentication}$=3), because the authentication trust factor should have a moderate weight in determining the trust score.

Before the radar sensor is compromised, the trust value associated with the trust factor of distance associated with the message is 0.4 (f(Distance)=0.4). In this example, a weight of 4 is assigned to the distance trust factor (Weight$_{Distance}$=4).

Before the radar sensor is compromised, the trust value associated with the trust factor of history between the electronic device receiving the message and electronic device sending the message is 1 (f(History)=1) because the radar sensor has a long history of being trusted. In this example, a weight of 4 is assigned to the history trust factor (Weight$_{history}$=1).

Based on Equation 1 and the trust values and weights described above, the initial trust score associated with a message from the radar sensor is 0.87 (Trust$_{radarMessage}$=0.87).

In this example, the data from the radar sensor and the camera may be used for two different tasks (to perform two different actions). First, the velocity of the second vehicle from the radar sensor and the velocity of the second vehicle from the camera may be used by an electronic device (for example, the third electronic device 120) to determine a value for a speedometer. The action of determining a speedometer value may be associated with an ASIL-B level and a risk score of 0.6. Second, the velocity of the second vehicle from the radar sensor and the velocity of the second vehicle from the camera may be used by an electronic device (for example, the first electronic device 110) to determine the velocity of the second vehicle in order to control the brakes of the vehicle 105. The action of controlling the brakes of the vehicle 105 may be associated with an ASIL-D level and a risk score of 0.8.

Figure 8:
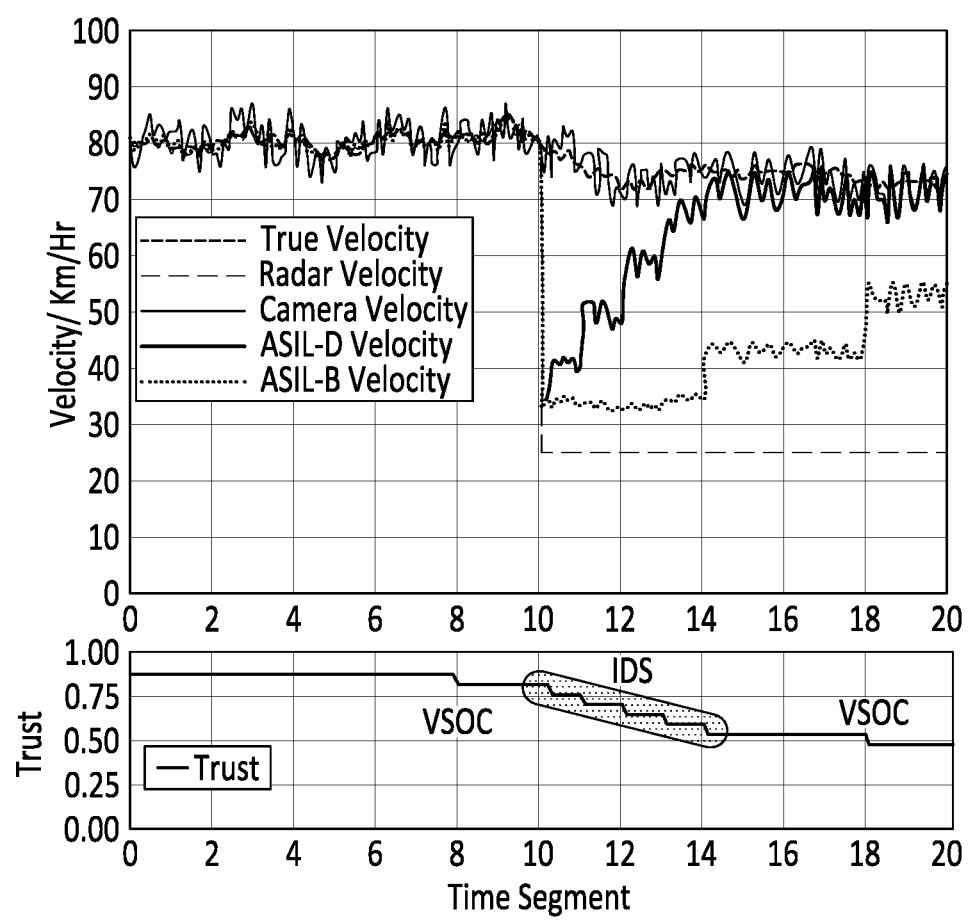
FIG. 8 provides a graph of an example scenario in which one or more of the implementations described herein are utilized.

FIG. 8 provides a graph 700 of how the velocity of the preceding vehicle determined or measured by different components changes once the radar sensor is compromised and how the trust score associated with messages from the radar sensor changes once the radar sensor is compromised. The true velocity of the preceding vehicle is illustrated as a short-dashed line in the graph 700. The velocity of the preceding vehicle from the radar sensor is illustrated as a long-dashed line. The velocity of the preceding vehicle from the camera is illustrated as a thin solid line. The bold solid line represents the velocity of the vehicle 105 determined by the first electronic device 110 based on the velocity received from the radar sensor and the velocity received from the camera. The dotted line represents the velocity of the vehicle 105 determined by the third electronic device 120 based on the velocity received from the radar sensor and the velocity received from the camera. At 8 seconds, the vehicle 105 receives a message from the VSOC, that other vehicles in the fleet have experienced suspicious activity in messages from radar sensors and the trust value for the VSOC trust factor is 0.8 (f (VSOC)=0.8). At 10 seconds, the radar sensor included in the vehicle 105 is compromised when an attacker changes the velocity sent by the radar sensor to 25 km/hr. At 10 seconds, the velocities of the preceding vehicle determined by the first electronic device 110 and the third electronic device 120 based on velocity received from the radar sensor and the velocity received from the camera drop to 33.3 km/hr.

When the radar sensor included in the vehicle 105 is compromised, the IDS included in the vehicle 105 quickly detects the suspicious behavior and trust value associated with the IDS trust factor causes a gradual downgrading the trust score associated with messages from the radar sensor in increments of 0.2 to begin. As the trust score associated with messages from the radar sensor decreases, the first electronic device 110 and the third electronic device 120 gradually transfer their reliance on the preceding vehicle velocity data from the more accurate, but compromised radar sensor to the less accurate, but uncompromised camera. Since the risk score associated with controlling the brakes of the vehicle 105 is higher than the risk score associated with determining a speed value for a speedometer, the first electronic device 110 reacts more quickly than the third electronic device 120 as the trust score decreases. At 14 seconds, the first electronic device 110 ceases to consider messages from the radar sensor when determining the speed of the preceding vehicle and instead relies on messages from the camera. At 14 seconds, the third electronic device 120 has only begun to give less consideration to messages received from the radar sensor and rely more on messages received from the camera. At 18 seconds, the fourth electronic device 130, implementing the VSOC, provides another update to the vehicle to further downgrade the trust score associated with messages received from the radar sensor with f(VSOC)=0.6 and the final trust score associated with the radar sensor is 0.48.

Thus, examples, aspects, and features herein provide, among other things, systems and methods for implementing a dynamic trust model in a vehicle.

What is claimed is:

1. A system for implementing a dynamic trust model in a vehicle, the system comprising:
a first electronic device including:
an electronic processor configured to:
receive, from a second electronic device, a message associated with an action to be performed by the first electronic device;
determine a trust score associated with the message;
determine, based on a safety consideration, a risk score associated with the action; and
in response to the trust score being greater than or equal to the risk score, perform the action.

2. The system according to claim 1, wherein the electronic processor is configured to determine a trust score associated with the message by:
determining the trust score associated with the message based on one or more trust factors.

3. The system according to claim 2, wherein the one or more trust factors include a threat likelihood determined by an intrusion detection system for the message, data from a vehicle security operations center, a history between the first electronic device and the second electronic device, a distance associated with the message, and an authentication status of the second electronic device.

4. The system according to claim 2, wherein the electronic processor is configured to assign a weight to each of the one or more trust factors.

5. The system according to claim 1, wherein the action includes controlling movement of the vehicle.

6. The system according to claim 1, wherein the action includes outputting information to a vehicle operator.

7. The system according to claim 1, wherein a safety consideration is a potential physical consequence of the action being performed and a value is assigned to the safety consideration based on a severity of harm associated with the potential physical consequence of the action.

8. The system according to claim 1, wherein the electronic processor is further configured to:
determine the risk score based on the safety consideration and a privacy consideration.

9. The system according to claim 1, wherein the electronic processor is further configured to:
in response to the trust score being less than the risk score, decline to perform the action.

10. A method for implementing a dynamic trust model in a vehicle, the method comprising:
receiving, from a second electronic device, a message associated with an action to be performed by a first electronic device;
determining a trust score associated with the message;
determining, based on a safety consideration, a risk score associated with the action; and
in response to the trust score being greater than or equal to the risk score, performing the action with the first electronic device.

11. The method according to claim 10, wherein determining a trust score associated with the message includes:
determining the trust score associated with the message based on one or more trust factors.

12. The method according to claim 11, wherein the one or more trust factors include a threat likelihood determined by an intrusion detection system for the message, data from a vehicle security operations center, a history between the first electronic device and the second electronic device, a distance associated with the message, and an authentication status of the second electronic device.

13. The method according to claim 11, the method further comprising:
assigning a weight to each of the one or more trust factors.

14. The method according to claim 10, wherein the action includes controlling movement of the vehicle.

15. The method according to claim 10, wherein the action includes outputting information to a vehicle operator.

16. The method according to claim 10, wherein a safety consideration is a potential physical consequence of the action being performed and a value is assigned to the safety consideration based on a severity of harm associated with the potential physical consequence of the action.

17. The method according to claim 10, the method further comprising:
determining the risk score based on the safety consideration and a privacy consideration.

18. The method according to claim 10, the method further comprising:
in response to the trust score being less than the risk score, declining to perform the action.

19. A system for implementing a dynamic trust model in a vehicle, the system comprising:
a first electronic device including:
an electronic processor configured to:
receive, from a second electronic device, a message associated with an action to be performed by the first electronic device;
determine a trust score associated with the message;
determine, based on a safety consideration, a risk score associated with the action; and
in response to the trust score being less than the risk score,
determine a decreased reliance value;
determine a value based on data included in the message and the decreased reliance value; and
based on the value, perform the action.

20. The system according to claim 19, wherein the decreased reliance value is determined based on the difference of the trust score and the risk score.

* * * * *